Patented Dec. 22, 1925.

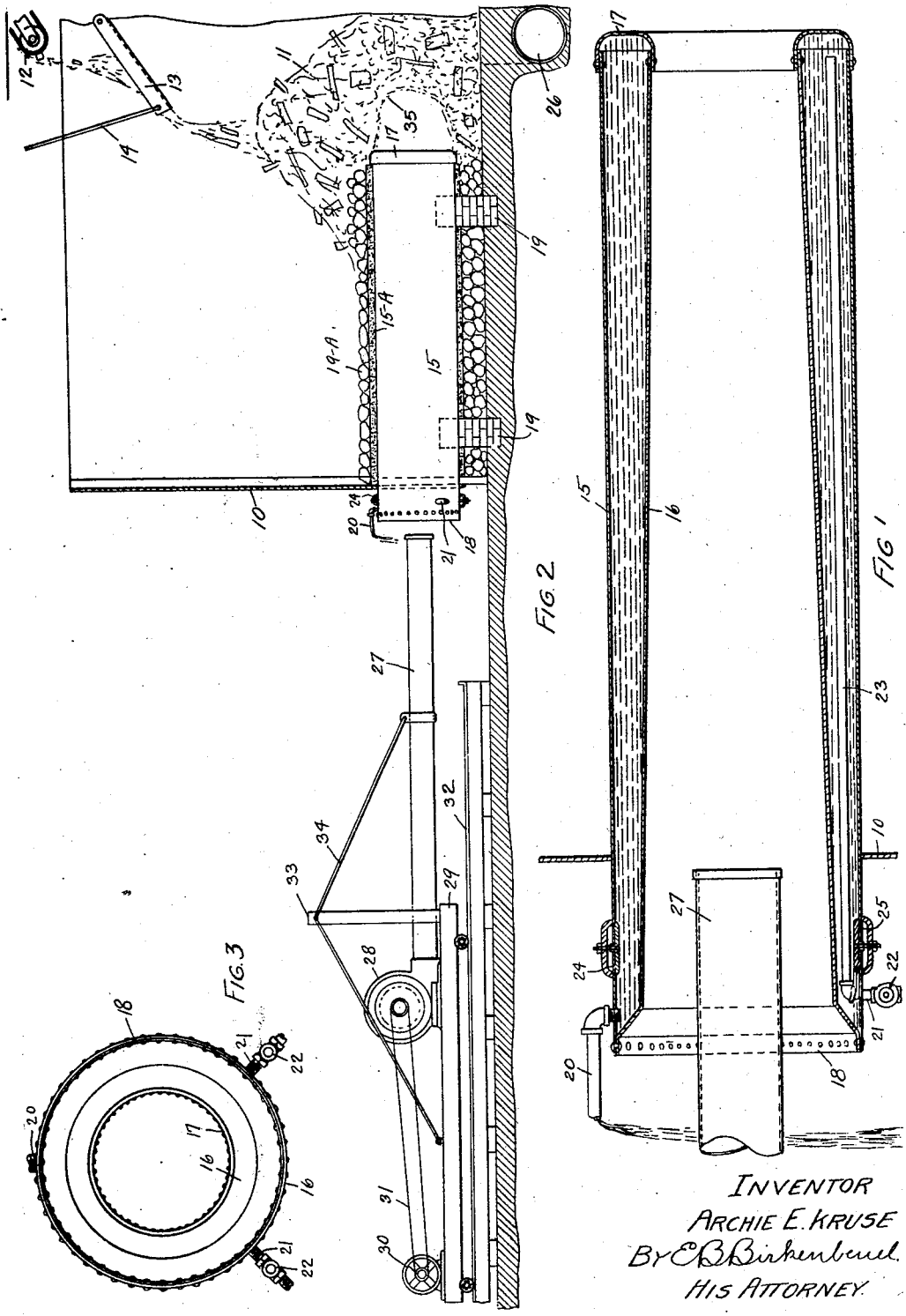

1,566,608

UNITED STATES PATENT OFFICE

ARCHIE E. KRUSE, OF PORTLAND, OREGON.

REFUSE BURNER.

Application filed September 22, 1924. Serial No. 739,070.

*To all whom it may concern:*

Be it hereby known that I, ARCHIE E. KRUSE, a citizen of the United States, and a resident of Portland, in the county of Multnomah and State of Oregon, have invented a new and useful Refuse Burner, of which the following is a specification.

This invention relates generally to refuse burners and particularly to the burning of such materials as saw dust.

An object of my invention is the provision of an exceedingly simple and efficient means for disposing of saw dust, edgings and general refuse accumulating in saw mills without an undue initial investment, large expenditure of labor for operation or high maintenance cost.

A second object is to so construct the device that no amount of careless handling will cause same to be injured by the heat generated by the combustion.

A third object is to permit the device to be easily moved out of the way for cleaning purposes, or for any other reason.

A fourth object is to provide a way of removing ashes from the burner with the least amount of labor and inconvenience.

A fifth object is to permit the boring of a hole or tunnel into a saw dust pile with the aid of the burner, and into which ample quantities of air can be fed to completely burn the pile.

A sixth object is to completely dispense with grate bars and all metal work liable to be injured by the heat.

In describing my device I have illustrated same in conjunction with a pit for receiving saw dust such as is generally found around saw mills.

While refuse burning is one of the principal uses for this device it must be understood that the same apparatus can be employed to generate heat under boilers, etc., without departing from the spirit of my invention.

I accomplish these results in the manner set forth in the following specification and illustrated in the accompanying drawing, in which:

Figure 1 is a sectional view through the water-cooled burner tip. Figure 2 is a section through a burning pit and saw dust pile showing the position of the burner tip and its relation to the entire apparatus, in elevation. Figure 3 is an end elevation of the burner tip as shown in Figure 1.

Similar numbers of reference refer to the same parts throughout the several views.

Referring in detail to the drawing, I have illustrated a portion of the usual burning pit whose walls 10 enclose a pile of saw dust 11 deposited by the conveyor 12 over the chute 13 whose discharge end may be adjusted by means of the cable 14 in any convenient manner.

Through the wall 10 I have projected a burner tip consisting of a cylindrical shell 15 having a tapering core 16 secured therein by means of the flanged ring 17 which projects into the saw dust pile and, by means of riveting the end 18 which projects outside of the wall 10. Around the shell 15 I have placed a layer of asbestos 15$^A$. The shell 15 is mounted on the piers 19 and rocks 19$^A$ are piled around the insulated shell leaving its ends open.

Opening into the shell 15 near the end 18 is an overflow pipe 20 and also the independent water supply pipes 21 provided with valves 22 which are incapable of completely shutting off the water supply. The pipes 21 are provided with extensions 23 between the shells 15 and 16 and discharge against the ring 17. I have also provided clean-out holes on the upper and lower sides of the projecting portion of the shell 15, which are normally kept closed by means of the covers 24 and 25. A tunnel 26, which leads from the outside of the burning pit to a point where most of the ashes are apt to form within the pit, is also provided for convenience in cleaning.

In front of the open end 18 of the burner tip and co-axial therewith, I have placed an air pipe 27 to which air is supplied by means of a blower 28 mounted on a carriage 29 and driven by a motor 30, also mounted on the carriage 29, through the medium of the belt 31. The carriage 29 is mounted on a track 32. A post 33 is mounted on the carriage 29 and supports the cable 34, which in turn, supports the pipe 27 from the carriage 29.

The operation of my device is as follows: If a pile of saw dust has accumulated within the pit in which no fire exists, it is only necessary to start some trash burning within the shell 16 and to start the blower 28, moving the discharge end of the pipe 27 into the shell 16 as the combustion gets under way until a crater 35 is formed within the pile 11.

It will be noted that in the beginning the surplus of air from the blower backfires, or comes out of the end 18, but that as the combustion increases that more air is required, until finally all of the air of the blower and the air which is drawn in through the shell 16 by the flow of air from the pipe 27 is required to feed the combustion.

After the flames have broken through the sides of the pile there is a natural draft through the shell 16 which permits the stopping of the blower, if desired, unless a very large amount of refuse is being deposited at the time. It will be observed that water is continually flowing from the pipe 20 under the control of the valves 22 which, as stated, are not capable of completely stopping this flow. If it develops that this water becomes abnormally hot, the flow is increased as much as desired, since the incoming water is discharged against the ring 17, which is at the hottest point of the entire device, and it can be seen that there is no danger of this exposed part being injured by the intense heat created.

If operating with a scarcity of water, the overflow can run into a cooling basin and re-used with very little effort, since only a few feet of head are required to operate the device.

If the water used is inclined to form a deposit or leave a sediment between the shells 15 and 16 it is only necessary to remove the covers 24 and 25 to thoroughly cleanse the water jacket. However, as there is a continual flow of water through the device this is necessary only on very rare occasions.

I am aware that many forms of saw dust burners have been constructed in the past, I therefore do not claim such devices broadly, but I do intend to cover all such forms and modifications as fall fairly within the appended claims.

I claim:

1. In a refuse burner, the combination of a water-cooled tube; a blower; and a nozzle on said blower adapted to be moved co-axially into said tube.

2. In a refuse burner, the combination of a water-cooled tube; a blower arranged to deliver air to said tube in a manner that its point of discharge through said tube can be varied; and means for depositing refuse to be burned approximately over the discharge of said tube.

3. A refuse burner having, in combination, a pit; a water-cooled tube passing through the wall of said pit; an adjustable conveyor arranged to discharge refuse upon the inner end of said tube; a slidable air supply pipe protruding into the outer end of said tube; and means for passing sufficient water around said tube to protect same from the heat generated.

4. In a refuse burner, the combination of a water-cooled tube with a carriage; a blower mounted on said carriage; a discharge pipe on said blower mounted co-axially with said tube; and means for driving said blower in a manner that air may be discharged into said tube at any portion of its length.

5. In a refuse burner, the combination of a tube consisting of a cylindrical outer shell; a tapering inner shell joined at its ends to said outer shell in a manner to form a water jacket; a pair of independently supplied water pipes discharging into the forward lower end of said jacket; a discharge pipe at the rearward and upper side of said jacket; and valve means for controlling the supply of water to said jacket but incapable of completely cutting off the supply therefrom.

ARCHIE E. KRUSE.